Patented May 6, 1941

2,240,672

UNITED STATES PATENT OFFICE 2,240,672

WELDING ROD

Robert Scherer, Gerhard Riedrich, and Hans Hougardy, Krefeld, Germany, assignors to Deutsche Edelstahlwerke Aktiengesellschaft, Krefeld, Germany, a corporation of Germany No Drawing. Application August 9, 1939, Serial No. 289,266. In Germany August 15, 1938

7 Claims. (Cl. 219—8)

The invention relates to methods and means for producing welds of superior qualities.

For welding structural steels, ingot iron, malleable iron, cast steel, gray cast iron, and silicon cast iron, the use of welding rods formed of chemically neutral austenitic chrome-nickel steels has been suggested as favorable. The composition of these welding rods was similar, except for slight deviations depending on the particular iron to be welded, to that of the well-known chrome-nickel steels as employed for other purposes where resistance to chemical attacks is desired. The percentage of chromium varied between 10 and 30%, and that of nickel between 2 and 30%. The welding steel, according to known suggestions, could also contain additions of tungsten, molybdenum, copper, titanium, vanadium, beryllium, and other metals. The structure of these welding steels was substantially of purely austenitic character.

The present invention takes cognizance of the fact that the known high-quality welding steels of purely austenitic character may show a deteriorating tendency which in many cases results in a destruction of the welded joint. The deterioration starts with the occurrence of cracks within the welding ridge, which, as a rule develop transversely to the main extension of the seam. This development proceeds and increases while the welded structure is subjected to the stresses of its normal operation, but may already become noticeable immediately after the welding operation. In many cases, the less expensive austenitic chrome-manganese steels, having between 5 and 20% chromium and 7 to 20% manganese, are employed instead of the above-mentioned austenitic chrome-nickel steels. However, welds made with austenitic chrome-manganese steels show the same tendency to develop transversal cracks.

According to the invention, the above-mentioned deteriorating tendency of welds produced by thermal fusion of chrome steels is prevented if the structure of the welding steel, i. e. the welding rod, besides being austenitic, contains a substantial amount of ferrite which, however, must remain within such limits as to leave the structure predominantly austenitic. The range of 5 to 35% ferrite, leaving 95 to 65% austenite, has proved to represent the limits within which the effect according to the invention is obtained, the steel containing 5 to 30% chromium and 5 to 25% of nickel and/or manganese. In particular, when using chrome-nickel steels, the compositions to be employed contain 10 to 30% of chromium and 5 to 25% of nickel, and when using chrome-manganese steels the limits are 5 to 20% of chromium and 7 to 20% of manganese, each particular composition being so chosen that the desired ratio of austenite to ferrite is obtained.

The desired percentage of ferrite between 5 and 35% may be adjusted by correspondingly choosing the ratio of the chromium and nickel, or chromium and manganese percentages. For instance, an alloy steel with 22% chromium, 10% nickel, 0.10% carbon, the remainder iron besides usual impurities, contains about 15% ferrite and about 85% austenite, and when used as a welding rod produces joints which exhibit the aforementioned quality. Another example according to the invention is an alloy steel with 16.5 to 17.5% chromium, 8 to 9% manganese, and 0.10% carbon, the remainder iron and usual impurities. This steel shows about 30% ferrite in an austenitic base structure and is also favorably applicable according to the present invention.

The desired amount of ferrite in an otherwise austenitic steel may also be effected or adjusted in known manner by means of ferrite-producing additions such as titanium, vanadium, aluminum, silicon, molybdenum, columbium and tantalum, which may be used singly or in combination with one another.

Welding rods of chromium steels containing nickel or manganese and having an austenitic base structure with 5 to 35% ferrite are applicable for welding all kinds of cast iron, ingot iron, wrought iron, and steel unalloyed or alloyed. The welding ridges along the seams produced with such austenitic-ferritic rods are free from the tendency of welds made from purely austenitic steels to form transverse cracks, and this advantage is not only apparent when, or immediately after, producing the weld, but remains also effective during the subsequent stressing of the joints by the normal operation of the welded objects.

We claim:

1. The method of producing crack-resistant welds which consists in depositing by thermal fusion metal from a welding rod formed of chrome steel with a 95 to 65% austenitic and 5 to 35% ferritic structure.

2. The method of producing crack-resistant welds which consists in depositing by thermal fusion metal from a welding rod formed of an alloy steel containing chromium in an amount of 5 to 30%, and metal selected from nickel and manganese in amounts of 5 to 25% for nickel and 7 to 20% manganese, the remainder substantially iron besides minor amounts of ferrite-producing auxiliaries and customary additions and impurities, said alloy steel having a structure composed substantially of 95 to 65% austenite and 5 to 35% ferrite.

3. The method of producing crack-resistant welds which consists in depositing by thermal fusion metal from a welding rod formed of a steel containing 10 to 30% chromium and 5 to 25% nickel, the remainder substantially iron, said alloy steel having a structure consisting of 95 to 65% austenite and 5 to 35% ferrite.

4. The method of producing crack-resistant welds which consists in depositing by thermal fusion metal from a welding rod formed of a steel containing 5 to 20% chromium and 7 to 20% manganese, the remainder substantially iron, said alloy steel having a structure consisting of 95 to 65% austenite and 5 to 35% ferrite.

5. A welding rod consisting of an alloy steel containing 5 to 30% chromium and a total of up to 25% of metal selected from 5 to 25% nickel and 7 to 20% manganese, the remainder substantially iron with minor amounts of auxiliaries and customary impurities, said alloy steel having an austenitic-ferritic structure containing 5 to 35% ferrite.

6. A welding rod consisting of an austenitic-ferritic alloy steel containing 16.5 to 17.5% chromium, 8 to 9% manganese, about 0.1% carbon, the remainder substantially all iron with small amounts of auxiliaries and impurities, said alloy steel having a structure composed of about 30% ferrite and about 70% austenite.

7. A welding rod consisting of an austenitic-ferritic alloy steel containing about 22% chromium, about 10% nickel, about 0.1% carbon, the remainder substantially all iron with small amounts of auxiliaries and impurities, said alloy steel having a structure composed of about 15% ferrite and about 85% austenite.

ROBERT SCHERER.
GERHARD RIEDRICH.
HANS HOUGARDY.